United States Patent [19]

Epstein

[11] Patent Number: 4,860,150

[45] Date of Patent: Aug. 22, 1989

[54] PROTECTOR NETWORK FOR A-C EQUIPMENT

[76] Inventor: Barry M. Epstein, 7523 Cliffbrook, Dallas, Tex. 75240

[21] Appl. No.: 183,227

[22] Filed: Apr. 19, 1988

[51] Int. Cl.[4] .............................................. H02H 3/24
[52] U.S. Cl. ...................................... 361/90; 361/91; 361/92; 361/75; 361/73; 361/60
[58] Field of Search .................... 361/91, 93, 94, 102, 361/59, 60, 71, 73, 75, 90, 92

[56] References Cited

U.S. PATENT DOCUMENTS 4,447,846  5/1984  McCleery ........................... 361/90
4,703,191 10/1987  Ferguson .......................... 361/91 X
4,757,416  7/1988  Wilkerson ......................... 361/91 X Primary Examiner—Derek S. Jennings
Attorney, Agent, or Firm—Terry M. Gernstein

[57] ABSTRACT

A power cutoff circuit is added to the protector network disclosed in U.S. Pat. No. 4,675,772 so that when an interruption in power occurs, at least one suppressor remains connected to a load even though a source is disconnected from the load. In one embodiment, the power circuit includes a control circuit connected to the supply lines between an "upstream" suppressor and a filter portion of the network.

24 Claims, 4 Drawing Sheets

PROTECTOR NETWORK FOR A-C EQUIPMENT

BACKGROUND OF THE INVENTION

1. Technical Field

The present invention relates in general to the art of protecting a-c equipment, and in particular to the art of protecting such a-c equipment from the effects of power surges. Specifically, the present invention relates to an improvement in a filter/protector network which is used to protect a-c equipment which will permit the a-c power to such loads to be turned off safely and instantaneously with respect to the attached load circuitry.

2. Description of the Prior Art

There are many applications where it is necessary to protect a-c load equipment from power surges and voltage transients which could deleteriously affect and damage such equipment. This protection is particularly important for equipment comprising high sensitive or complex multiple loads susceptible to electrical noise. Examples of such equipment are found in the computer art, the communications art as well as in many other arts.

As discussed in U.S. Pat. No. 4,675,772 issued to this inventor, and the disclosure of which is incorporated herein by reference thereto, there have been numerous types of protective networks designed in an attempt to protect such equipment from the power surges and transients. The above-referenced patent discloses a means for protecting such equipment from the effects of such power surges and transients in the power source as well as from respective spikes from both the source and the load.

It is often necessary to switch off the power to such equipment due to various reasons, such as environmental conditions existing adjacent to the load, or the like. Examples of such environmental reasons are: humidity in the area rising above a level that is safe for the operation of the equipment; air flow around the equipment falling to a level that is unacceptable; water forming beneath the equipment, or the like. Any of these conditions may result in damage to the load equipment or to undesirable results, and may require shut down of the load. There are, of course, many other reasons for interrupting the power to a load, and the above are intended to be examples only.

In the past, this interruption of power has been accomplished by means of relays or the like which incorporate switch circuitry. With such relay systems, the load input transformer is usually left open circuited.

However, since most load inputs include an inductor or a transformer, it has been found that when the power to such equipment is turned off in this manner, due to the characteristics of an inductor, a high voltage spike will be developed as the inductor attempts to keep current constant when the input switch is opened. This spike can damage the load equipment.

Another problem with presently known equipment is that in the event of a power outage, many circuits such as shunt trip breakers, or the like, drop out after power is restored. This may then expose the load to further transients in the source as it is being brought back up to power levels. This drop out may also expose the load to multiple transients, rapid and repeated on/off occurrences, and instabilities associated with the source/utility power loss event as well as a further transient as the shunt trip finally shuts down.

Still further, due to the characteristics of these systems, there may be a delay in the restoration of power to the load equipment after the source power is restored.

Thus, there is need for a means for interrupting power from a source to a load in a manner that is both quick and effective while still being safe for use in conjunction with sensitive electronic loads such as computers or the like.

Objects

It is a main object of the present invention to provide a means for safely and quickly interrupting power from a source to a load.

It is another object of the present invention to permit the power to sensitive electronic equipment to be turned off without subjecting such equipment to the deleterious effects of spikes which can be developed in such equipment.

It is another object of the present invention to provide means for ensuring that a load is not exposed to transients in source power or to transients which might occur when a relay or shunt trip shuts down.

It is another object of the present invention to provide means for ensuring that a load is not exposed to multiple source/utility rapid on/off instabilities and transients which may be associated with the loss and return of source/ utility power.

It is another object of the present invention to improve the protector network disclosed in U.S. Pat. No. 4,675,772.

Summary of the Invention

These and other objects are accomplished by adding a power cutoff circuit to the protector network disclosed in the referenced patent 4,675,772. Specifically, the power cutoff circuit is added to the protector network of the referenced patent in a manner such that at least one voltage suppressor is always connected across the load during shutdown of the source. In this manner, the load is protected against transients occurring in the source and is also protected against transients occurring as a result of shutdown.

The protector network of the referenced patent includes a filter portion connected between a load and a source of power, a first suppressor connected between the filter and the source and a second suppressor connected between the filter and the load. As fully discussed in this patent, the first suppressor is principally effective to protect the load against power surges and voltage transient at the "source" side of the network, and the second suppressor is principally effective to prevent reactive spike voltage build-up as a consequence of conditions occurring in the load or between the load and the filter portion.

This power cutoff circuit of the present invention includes a means for interrupting power from the source and a control circuit connected across the supply lines. Specifically, the control circuitry is connected across the supply lines between the first suppressor and the filter portion. The power cutoff circuit includes a means for re-establishing power to the load, and this means may be manually operable or operable according to set conditions.

By using the power cutoff circuit of the present invention in conjunction with the protector network of the referenced patent, the various surge suppressors of the protector network stay attached at all times to the load. This prevents buildup of reactive spikes in the load circuit which would normally happen if a relay system were merely placed in the output lead to the load. Still further, by using the power cutoff circuit of the present invention a relay or contactor coil can be directly energized from the input power line so that as input power is lost, the contacts can immediately open so power to the load is immediately dropped as source power is lost. Yet, due to the presence of the filter network and the second suppressor between the relay and the load, the above-discussed spike is not developed. Thus, the load can be protected against transients in utility power without the drawbacks of the spikes associated with prior art systems. This circuit can also be arranged to be reactivated by any suitable means, such as a push-to-start means or a delay means or the like.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
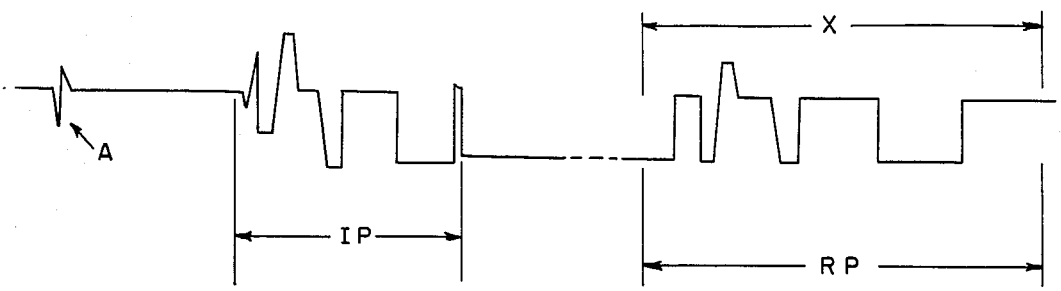
FIG. 1 is a schematic indicating the power instabilities which may be associated with a utility outage.

Shown in FIG. 1 is a schematic indicating the reaction of power supplied from a source, such as a utility, during a power outage. As can be seen in FIG. 1, the power may include a spike A, which can be ridden out by a protective network such as disclosed in the referenced patent, 4,675,772. However, the power may also include a period of instability indicated in FIG. 1 as the time period IP. If the protection network is set to drop out at a specific time, this period may exceed such time, and thus may damage the equipment being protected. Still further, the power may undergo a period of instability during its return, such as indicated in FIG. 1 by the indicator RP. The protective network of the present invention is designed to protect the load against all such instabilities, A, IP and RP.

Figure 2:
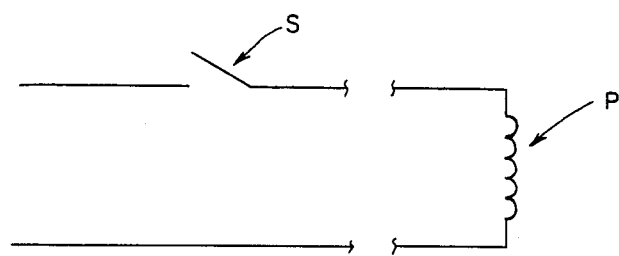
FIG. 2 is a schematic showing a prior art switch means in combination with a transformer means.

Referring next to FIG. 2, there is shown a switch S in conjunction with a primary coil P of a transformer in a load power supply. The switch S can be a manual switch, a relay, a contactor, or the like. As sometimes occurs, the power supply must be shut down, in which case, the switch S is operated.

Figure 3:
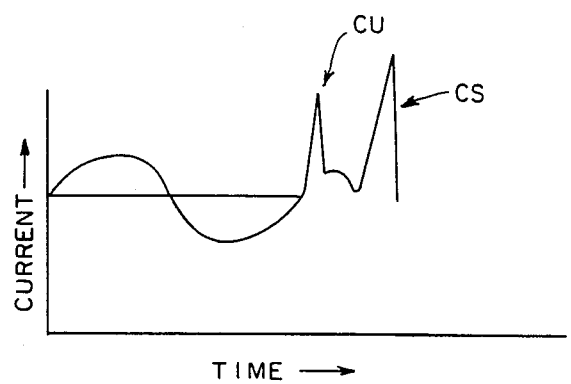
FIG. 3 is a schematic representation of a spike developed due to transformer inductance associated with the closing of the switch means shown in FIG. 2.

However, due to the characteristics of an inductor, the operation of the switch S will cause a spike as the inductor tries to keep current constant. Such a spike is indicated in FIG. 3 as spike CS in the current/time curve. This spike CS that can damage sensitive equipment, such as computers or the like. Additionally, the spikes, such as CU or other such actions may be generated due to rapid loss and/or return of utility power before switch S can operate. The present invention is directed to ensuring that at least one voltage suppressor is always positioned to address this spike and the load equipment.

Figure 4:
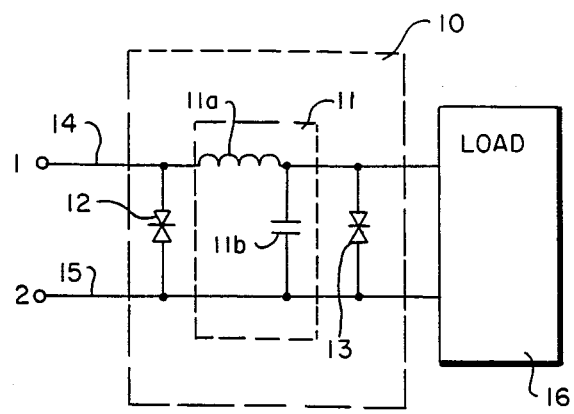
FIG. 4 is a schematic diagram illustrating the basic surge voltage protector and filter network of the invention disclosed in U.S. Pat. No. 4,675,772.

Referring next to FIG. 4, it is seen that the protective network disclosed in U.S. Pat. No. 4,675,772 includes two voltage suppressors 12 and 13 each located on one side of a filter portion 11, all of which is located between a source (not shown) and a load 16 and connected between supply lines 14 and 15 which supply a-c power to the load 16. As discussed in this patent, the voltage suppressor 12 is principally effective to protect the load against power surges and voltage transients at the source side of the network; whereas, the voltage suppressor 13 is principally effective to prevent reactive spike voltage build-up as a consequence of conditions occurring in the load 16 or between the load and filter portion 11. With this type of system, there are two voltage suppressors, and such a system is modified according to the present invention to protect the load 16 from the spikes CS associated with the shut-down of the source.

Figure 5:
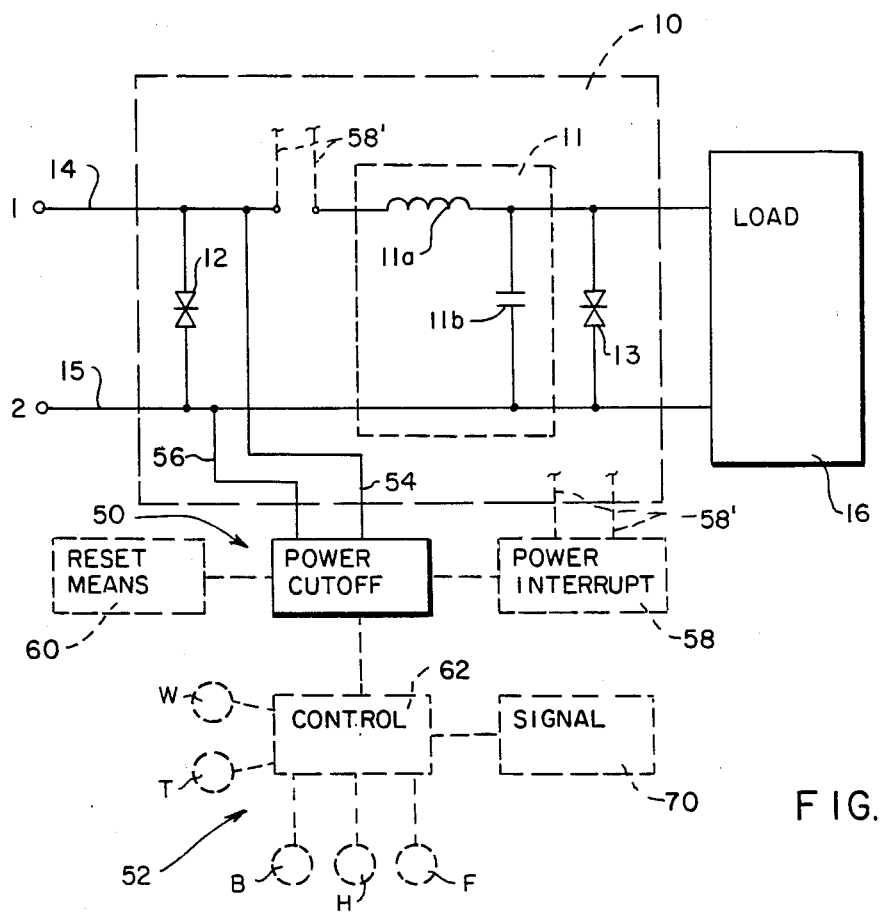
FIG. 5 is a schematic diagram illustrating the manner in which the basic surge voltage protector and filter network of FIG. 4 is modified in accordance with the present invention.

The modification according to the present invention is shown in FIG. 5, and attention is now directed to such figure.

As shown in FIG. 5, a power cutoff control circuit 50 includes a control circuit 52 having leads 54 and 56 each connected respectively one each on both sides of the supply lines 14 and 15. As shown in FIG. 5, the leads 54 and 56 are attached to the supply lines in front of the filter portion 11 and behind the first voltage suppressor 12. In other words, the connection of the control circuit is "upstream" of the filter portion 11 and is "downstream" of the first voltage suppressor 12.

In this manner, the network includes an input stage that always protects control logic and the relay contacts as well as protecting the load. The "downstream" voltage suppressor 13 is always connected to the load and therefore stops load self-spiking, and also protects the relay contacts and the control logic from such self-spikes.

The power cutoff means 50 also includes a power interrupt means 58 for interrupting the supply of power from the source to the load 16. Such interrupt means 58 can include relays, contactors, solid state devices or the like and is thus shown in FIG. 5 in phantom lines to indicate that such interrupt means can be any of a wide variety of such elements. The interrupt means 58 can also be connected as indicated by dotted line 58' in FIG. 5.

The power cutoff means 50 also includes a re-set means 60 which is indicated in FIG. 5 in phantom lines as it can be any sort of re-set means, including, but not limited to, manual push-to-start means, or time delay means, such as timing circuits or the like, or other such re-set means as will occur to one skilled in the art based on the teaching of this disclosure.

If a time delay means is used, the timer circuit can be designed to monitor power for a predetermined time period, indicated in FIG. 1 by the interval X (such as, for example, 120 seconds, or the like) of the steady utility power before the contactor or relay supplying power to the output is re-energized. If the power fails in the timing interval, the time can be reset to zero to start the timing period again. This compensates for the fact that utility power may be unstable on its initial return, as indicated in FIG. 1 and discussed above, and prevents the load from being exposed to such instabilities by providing a minimum "settle-down" period as needed for discs, etc. before re-start.

As indicated in FIG. 5, the power cutoff means 50 can also include control means 62 for operating the cutoff circuit to further protect the load against damage from environmental conditions. As above discussed, this control means 62 means can be operative to cause the power cutoff means to interrupt power supply to the load 16 in the event of the occurrence of such environmental conditions such as: ambient temperature, in which case, the control means includes a thermostat indicated as T in FIG. 5; emergency cutoff means, such as a button B shown in FIG. 5; humidity, in which case, the control means includes a humidistat H; loss of air flow adjacent to the load, in which case the control means includes an air flow meter F; water adjacent to the load, in which case the control means includes a water sensor W; or the like.

Still further, the control means 60 can include a signal means 70 which indicates when the control means has operated to interrupt power supply to the load. Such a signal means can include an alarm which is either audible or visual, and which can be positioned locally or remotely with respect to the load. The control means can also include means for dialling a telephone to provide a remote indication of problems or loss of power.

It is also noted that the entire network, including the power cutoff means, can be integrated unit, if suitable.

Figure 7:
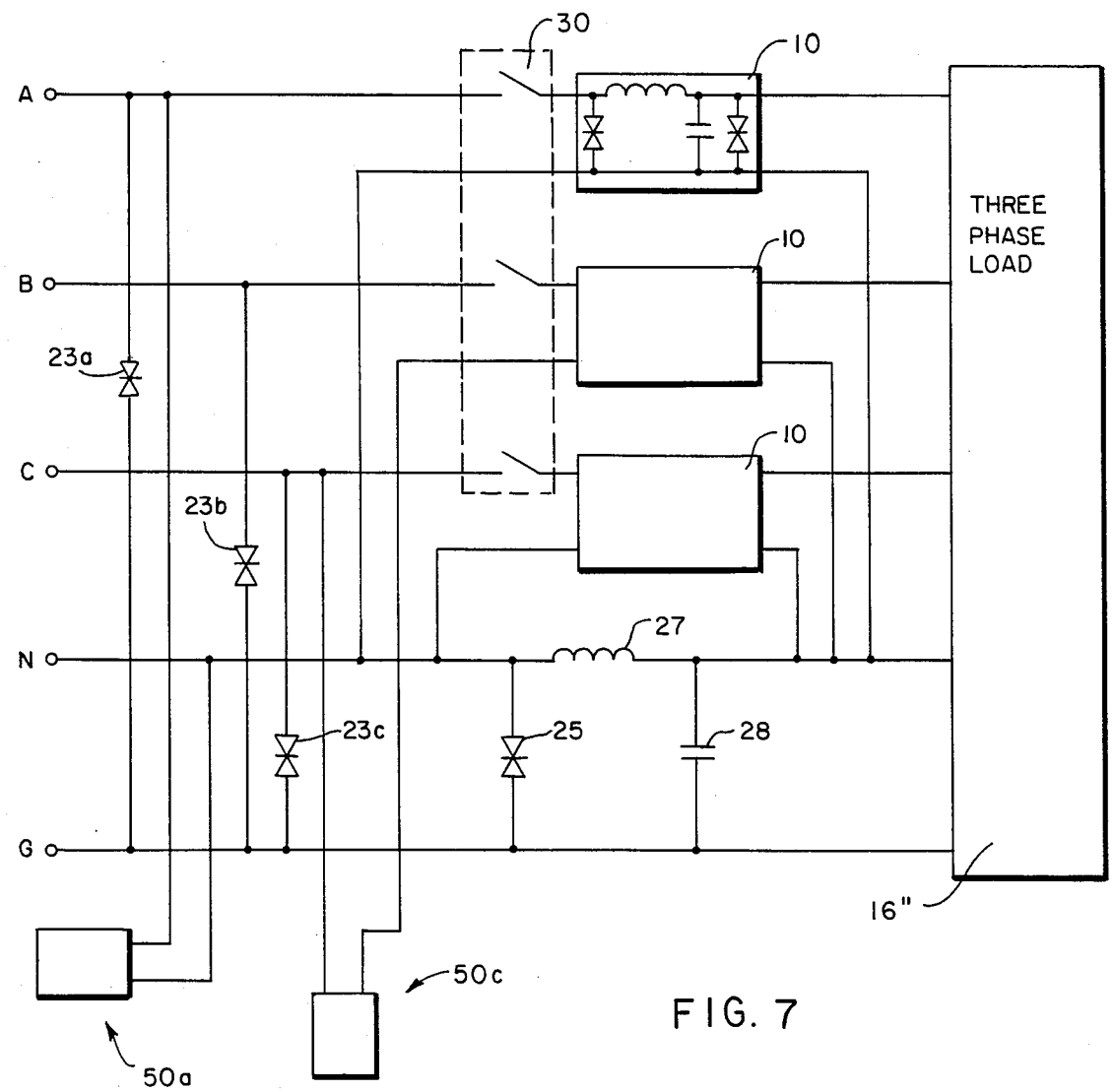
FIGS. 6, 7 and 8 correspond to FIGS. 2, 3 and 4 respectively of U.S. Pat. No. 4,675,772 illustrating the manner in which these networks are modified in accordance with the present invention.
Figure 6:
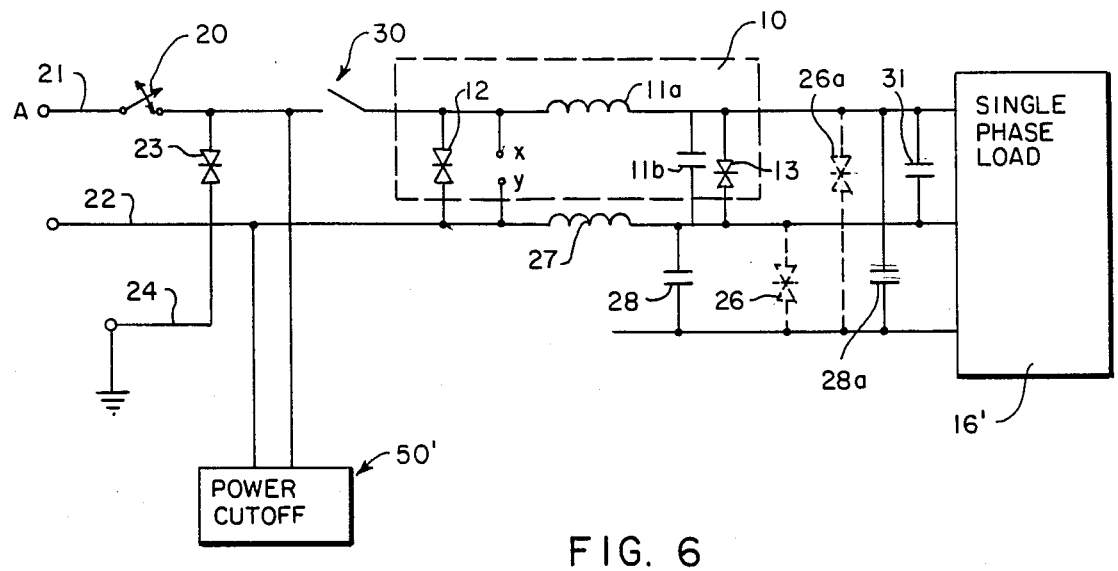
Figure 8:
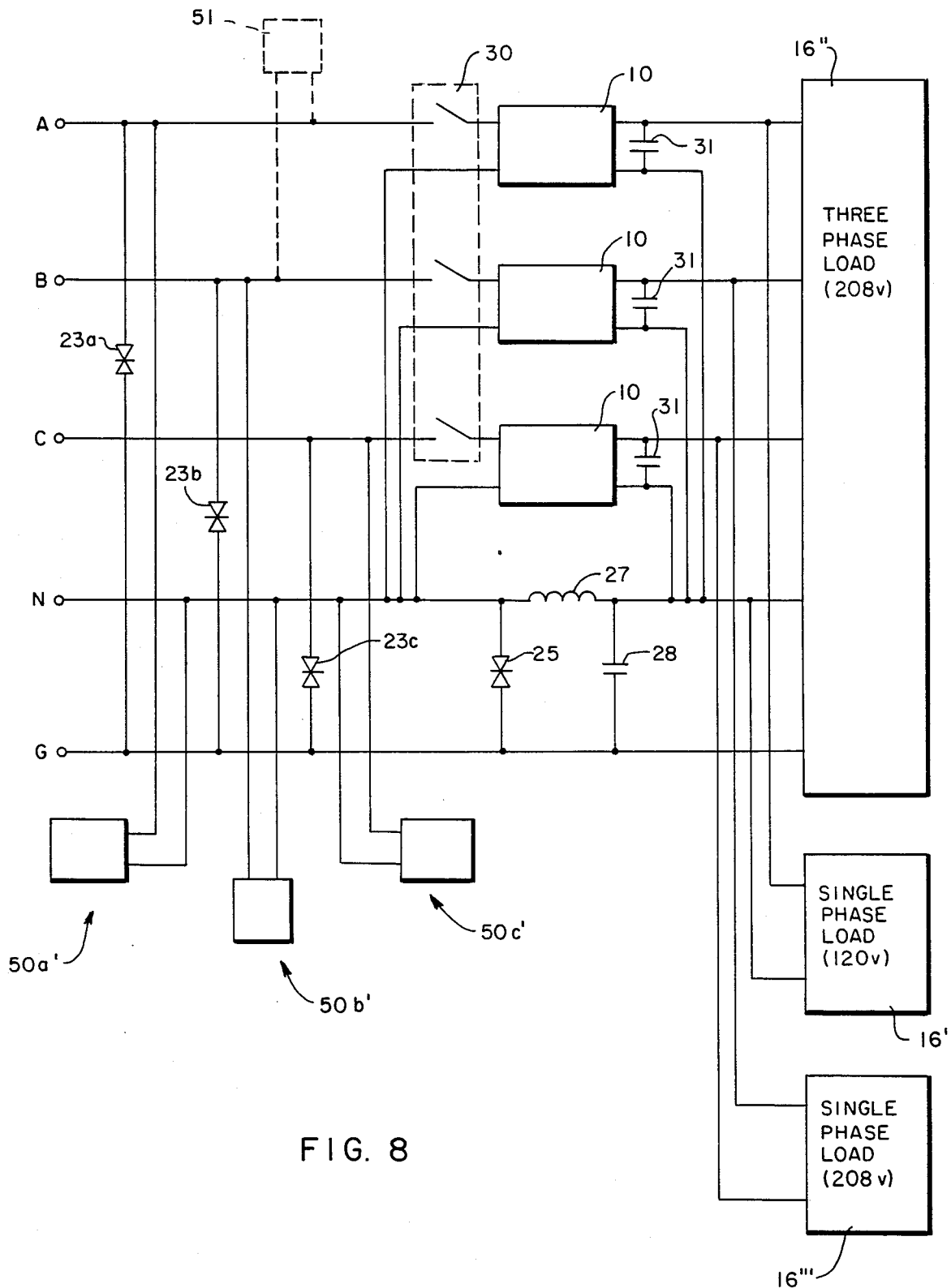

Referring to FIGS. 6, 7 and 8, it is seen how the power cutoff means 30 of the present invention can be included in the single phase load (FIG. 6), the polyphase load (FIG. 7) and a multi-type load (FIG. 8) such as are disclosed and discussed in U.S. Pat. No. 4,675,772. Reference is made to such patent for a discussion of these systems, and it is seen in FIGS. 6, 7 and 8 how the control circuit is connected between phases to accomplish the functions and results set forth above. For example, as seen in FIG. 6, a power cutoff means 50' is connected to the network; in FIG. 7 cutoff means 50a and 50c are included; and in FIG. 8 cutoff means 50a', 50b' and 50c' are included. It is also noted that a single control means could be used and could incorporate all three phases. Such a single control is indicated in FIG. 8 by the dotted line system 51 connected between phases A and B.

Each of the control systems and power cutoff means of the FIG. 6, 7 and 8 embodiments can include the modifications discussed above, and other power cutoff means could be used without departing from the scope of the present invention. Thus, the relays and contactors disclosed herein are merely examples, and are not intended as limitations.

It is to be understood that while certain forms of the present invention have been illustrated and described herein, it is not to be limited to the specific forms or arrangement of parts described and shown.

I claim:

1. A system wherein a-c power is supplied to a load from an a-c voltage source comprising:
   (a) a protector network disposed between said voltage source and said load, said protector network comprising a first voltage suppressor at the source side of said network connected across the supply lines from said source, a second voltage suppressor at the load side of said network connected across the supply lines to said load, the minimum breakdown voltage of said first suppressor being that voltage, above which would damage the load, whereby the breakdown of the second voltage suppressor results in the voltage across the load being below that which would damage the load and protecting said load from power surges and voltage transients occurring at said source side;
   (b) filter means disposed between said first and second voltage suppressors for filtering the power to said load, said second voltage suppressor being effective to protect the load from conditions occurring at the load side; and
   (c) a power cutoff circuit having control circuitry connected across the supply lines from said source for disconnecting said source from said load in the event of a power interruption so that when a power interruption occurs, at least one suppressor remains connected to the load even though the source is disconnected from the load.

2. The system defined in claim 1 wherein said control circuitry is connected across the supply lines between said first voltage suppressor and said filter means.

3. The system defined in claim 1 wherein the breakdown voltage of the second voltage suppressor is that voltage above which would damage the load.

4. The system defined in claim 2 wherein said power cutoff means includes a reset means for re-establishing power supply to said load after the power from the source has been restored.

5. The system defined in claim 4 wherein said power cutoff means reset means includes a manual push-to-start means.

6. The system defined in claim 4 wherein said power cutoff means reset means includes a restart-after-delay means.

7. The system defined in claim 1 wherein said power cutoff means control circuit includes a thermostat to interrupt power to said load from said source if ambient temperature associated with the load exceeds a predetermined level.

8. The system defined in claim 1 wherein said power cutoff means further includes an emergency manually operated shut-off means for manually interrupting power supplied to said load from said source.

9. The system defined in claim 1 wherein said power cutoff means further includes an environmentally controlled cutoff means for interrupting power supplied to said load from said source upon the occurrence of a specified environmental condition.

10. The system defined in claim 9 wherein said specified environmental condition includes humidity in the environment associated with said load exceeding a predetermined level.

11. The system defined in claim 9 wherein said specified environmental condition includes the occurrence of water beneath the load.

12. The system defined in claim 9 wherein said specified environmental condition includes air flow adjacent to the load being below a specified level.

13. The system defined in claim 1 wherein said power cutoff means is integrated into a circuit containing said protector network and said filter means.

14. The system defined in claim 1 wherein said power cutoff means includes a signalling means for indicating when power to said load from said source is interrupted.

15. The system defined in claim 14 wherein said signalling means includes an alarm means.

16. The system defined in claim 14 further including a telephone dialer.

17. The system defined in claim 6 wherein said re-start-after-delay means includes a timer circuit designed to monitor incoming power from said voltage source for a predetermined time period of steady power before re-connecting said source and said load.

18. The system defined in claim 17 wherein said timer circuit includes means for re-setting said timer back to zero if the power from said source fails in the timing interval so the predetermined time period is restarted by such failure in said timing interval.

19. The system defined in claim 1 wherein said source and said load are both multiphase.

20. A protective circuit for installation in a network wherein a voltage is supplied to a load from a voltage source, said protective circuit being disposed between said source and said load and effective to prevent damage to said load from transient conditions occurring at both the source and load sides of said network, said protective circuit comprising:

a first voltage suppressor at the load side of said network;

a second voltage suppressor at the load side of said network;

a filter means disposed between said first and second voltage suppressors for filtering the input power to said load, the voltage breakdown of said first voltage suppressor, as distinguished from the voltage breakdown of said second voltage suppressor, being principally effective to protect said load from transient conditions occurring at said source side, while the voltage breakdown of said second voltage suppressor, as distinguished from the voltage breakdown of said first voltage suppressor, being principally effective to protect said load from transient conditions occurring at said load side; and a power cutoff circuit connected across the supply lines from said source for interrupting power supplied from said source to said load in the event of an interruption of power from said source.

21. The protective network defined in claim 20 wherein said power cutoff circuit is connected to said supply lines between said first voltage suppressor and said filter means.

22. The protective network defined in claim 21 wherein said source is multiphase and said load is multiphase.

23. The protective circuit defined in claim 20 wherein said voltage is a-c and said load is a-c.

24. The protective network defined in claim 20 wherein said first and said second voltage suppressors are designed to break down at the same breakdown voltage level.

* * * * *